United States Patent

Shimaya et al.

[15] 3,701,893

[45] Oct. 31, 1972

[54] DATA CONVERTER FOR A COMPUTER SYSTEM

[72] Inventors: Kazunori Shimaya; Katsuzo Kaneko; Yoshinori Fujio; Yoshihiro Sato, all of Tokyo, Japan

[73] Assignee: Nippon Electric Company, Limited, Tokyo, Japan

[22] Filed: Aug. 23, 1971

[21] Appl. No.: 173,849

[30] Foreign Application Priority Data

Aug. 28, 1970 Japan....................45/75406

[52] U.S. Cl...............................................235/154

[51] Int. Cl...............................................G06f 3/00

[58] Field of Search......235/154; 340/347 DD, 172.5

[56] References Cited

UNITED STATES PATENTS 3,474,442 10/1969 Centanni..................235/154

3,631,471 12/1971 Griffiths...................235/154

*Primary Examiner*—Maynard R. Wilbur

*Assistant Examiner*—Jeremiah Glassman

*Attorney*—Sandoe, Hopgood & Calimafde

[57] ABSTRACT

A data converting method and apparatus for converting a first data including numerical data and letter data of a first number of binary digits, such as a character unit, to a second data of a second number of binary digits, such as a byte unit, and vice versa, in response to data-conversion signals supplied from a central data processor. In the method and apparatus of the invention a first additional code is added to the letter data prior to the conversion of the data, and a predetermined number of bits of the numerical data are packed and converted to the second data after the ommission of redundant and nonrelated bits. A second additional code is added to the excess numerical data in the second data produced in the packing process. The portion of the second data which include the first additional code is converted into numerical data. The portion of the second data containing neither of the additional codes is converted to a predetermined plural number of numerical data.

5 Claims, 15 Drawing Figures

| x | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| g(x) | 1.5 | 1.32 | 1.19 | 1.09 | 1.02 | 0.96 | 0.91 | 0.87 | 0.83 | 0.79 | 0.75 |

$$g(x)=\frac{3}{2(1-x)+x(1-x)^2+4x}$$

| x | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| h(x) | 2 | 1.75 | 1.59 | 1.46 | 1.36 | 1.28 | 1.21 | 1.15 | 1.10 | 1.05 | 1 |

$$h(x)=\frac{4}{2(1-x)+x(1-x)^2+4x}$$

*INVENTORS*
KAZUNORI SHIMAYA
KATSUZO KANEKO
YOSHINORI FUJIO
YOSHIHIRO SATO by
Sandoe, Hopgood & Calimafde
ATTORNEYS INVENTORS
KAZUNORI SHIMAYA
KATSUZO KANEKO
YOSHINORI FUJIO
YOSHIHIRO SATO
by
Sandoe, Hopgood & Calimafde
ATTORNEYS

*INVENTORS*
KAZUNORI SHIMAYA
KATSUZO KANEKO
YOSHINORI FUJIO
YOSHIHIRO SATO by
Sandoe, Hopgood & Calimafde
ATTORNEYS

INVENTORS
KAZUNORI SHIMAYA
KATSUZO KANEKO
YOSHINORI FUJIO
YOSHIHIRO SATO by
Sandoe, Hopgood & Calimafde
ATTORNEYS INVENTORS
KAZUNORI SHIMAYA
KATSUZO KANEKO
YOSHINORI FUJIO
YOSHIHIRO SATO
by
Sandoe, Hopgood & Calimafde
ATTORNEYS INVENTORS
KAZUNORI SHIMAYA
KATSUZO KANEKO
YOSHINORI FUJIO
YOSHIHIRO SATO
by
Sandoe, Hopgood & Calimafde
ATTORNEYS INVENTORS
KAZUNORI SHIMAYA
KATSUZO KANEKO
YOSHINORI FUJIO
YOSHIHIRO SATO
by
Sandoe, Hopgood & Calimafde
ATTORNEYS INVENTORS
KAZUNORI SHIMAYA
KATSUZO KANEKO
YOSHINORI FUJIO
YOSHIHIRO SATO
by
Sandoe, Hopgood & Calimafde
ATTORNEYS

DATA CONVERTER FOR A COMPUTER SYSTEM

This invention relates generally to data converting, and more specifically to a data converter for use in an electronic computer system and electronic exchanging system, and the like.

In a typical computer system, data transfer is carried out in parallel form by a word unit or character unit. In a computer system of this type, data transferring and converting operations affect the data processing speed, memory capacity, and bit density. In this respect, in a recently developed computer system, data transfer is performed not in word unit or character unit, but in such a manner that several data are packed by word or character unit in response to instructions from the computer program. The improvement derived by this operation is based on the fact that most parts of data used in the computer are occupied by numerical data as opposed to letter data. As a result, data processing speed, memory capacity, and bit density are significantly increased. However, in this computer system, additional time for reading, decoding, and executing operations for instructions is required each time that several numerical data are packed or unpacked.

The packing and unpacking operation of this conventional system is disclosed in a paper entitled "Decimal Arithmetic" appearing in "IBM System Reference Library (IBM System/360 Principle of Operation)," pages 35 to 40, published in September 1968 by International Business Machines Corporation.

It is, therefore, an object of this invention to provide a data converting method and a data converter, in which the above-mentioned disadvantages of a computer system are eliminated. It is a further object of the invention to provide a data converting method and data converter in which data processing speed, memory capacity, and bit density are increased.

The data conversion method of this invention converts a first data of a first predetermined number of binary digits into a second data of a second predetermined number of binary digits, and vice versa, in response to first and second data-conversion signals supplied from a central data processor, the first data including letter data and numerical data. The invention is characterized in that a first additional code is added to each of the letter data before conversion of the first data into the second data. A predetermined number of bits of the numerical data are packed and converted into the second data after redundant bits not relative to the expression of its contents have been omitted, and a second additional code is added to each of the excess numerical data produced in the process of packing into the second data after the omission of the redundant bits of each of the excess numerical data not relative to the expression of its contents. Each of the second data having the first additional code is converted into one letter data and each second data including the second additional code is converted into one numerical data. The second data, which does not include the first and second additional codes, is converted into the predetermined plural number of numerical data.

The data converting apparatus of this invention for carrying out the method described above includes a first decision circuit for discriminating whether the first data is letter data or numerical data, and a second decision circuit for discriminating whether each of the second data is one that is converted from letter data or numerical data. An output timing signal generating circuit generates a first and a second control signal upon the receipt of the first and the second data-conversion signals, respectively, the first and second control signals being used for the conversion of the first data into the second data, and of the second data into the letter data or the numerical data in response to the outputs of the first and second decision circuits, respectively. A first data converting circuit responsive to the first control signal adds a first additional code to each of the letter data, for the conversion of the first data into the second data, to pack predetermined number of serial bits of the numerical data for the conversion of the first data into the second data after omitting from each numerical data redundant bits that are not relative to the expression of its contents, and to convert each excess numerical data produced in the packing process into the second data after omitting redundant bits not relative to the expression of its contents and adding a second additional code thereto. A second data converting circuit operating in response to the second control signal converts each of the second data having the first additional code into each letter data, to convert each of the second data having the second additional code into each numerical data, and to convert each of the second data having neither the first nor second additional codes into the predetermined plural number of numerical data.

Consequently, the following advantageous effects are attained by the data converter of this invention.

In the prior art, programmed instructions are indispensable for the pack and unpack designation each time a data converting operation is performed, and a considerable time period is required for the performance of the reading, decoding, and executing operations for these instructions. In contrast, the data converting method and apparatus of this invention makes it possible to perform an automatic data converting operation by hardware means, thus eliminating the time-consuming software procedures. Moreover, the present invention makes it possible to conserve the capacity of the external memory of the computer such as a magnetic drum, magnetic tape or magnetic disc, to thereby increase the bit density of the memory and computer.

Moreover, the speed of data transfer from the central processor to the external memory can be increased and the data processing speed in a computer system can be increased by the present invention.

The principles of the data converting method of this invention are as follows:

It is assumed that data K is composed of six bits ($a_1$, $a_2$, $a_3$, $a_4$, $a_5$ and $a_6$) and comprises numerical data P and letter data Q. In the numerical data P, the four least significant bits ($a_1$, $a_2$, $a_3$ and $a_4$) indicate the contents of the data, and the two most significant bits ($a_5$, $a_6$) have no meaning. In the letter data Q, the last mentioned two bits have the meaning, and the combination of those two bits and the former four bits indicates the contents of the data. A code $P_=$ represents a first additional code consisting of the bits $a_1$*, $a_2$*, $a_3$* and $a_4$*, and is represented by the combination of the lower four bits ($a_1$, $a_2$, $a_3$, $a_4$). However, code $P_=$ represents neither numerical data P nor letter data Q. A code $P_{==}$ represents a second additional code consisting of the bits $a_3^{}$ and $a_4^{}$ and is represented by the combination of the lowest two of the lower four bits. As with code $P_=$, the code $P_{==}$ represents neither numerical data P nor letter data Q. It is further assumed that data R consists of eight bits ($b_1$, $b_2$, $b_3$, $b_4$, $b_5$, $b_6$, $b_7$ and $b_8$), whereas data R comprises the letter data Q or the lower four bits of the single or two number of the numerical data P. Two sequential and numerical data P are packed and converted into data R ($a_1$, $a_2$, $a_3$, $a_4$, $a_1'$, $a_2'$, $a_3'$, $a_4'$) after the omission of the upper two bits ($a_5$, $a_6$) which have no meaning of the data expression. The first additional code $P_=$ is added to the lower four bits of each excess numerical data P produced when a packing operation for two sequential numerical data P is performed. Then, each excess data P is converted into data R ($a_1$, $a_2$, $a_3$, $a_4$, $a_1^*$, $a_2^*$, $a_3^*$, $a_4^*$). Letter data Q is converted into data R ($a_5$, $a_6$, $a_3^{}$, $a_4^{}$, $a_1$, $a_2$, $a_3$, $a_4$) after the addition of the second additional code $P_{==}$.

In contrast, when neither the first additional code $P_=$ nor the second additional code $P_{==}$ is detected in data R, data R is converted into two numerical data P. In addition, when the first additional code $P_=$ is detected but when the second additional code $P_{==}$ is not detected, data R is converted into one numerical data P. When the second additional code $P_{==}$ is detected, data R is converted into one letter data Q.

The principles of the data converting method of this invention will be described more specifically in conjunction with Tables 1 and 2 that follow below.

TABLE 1

| | Kinds | Numeral or letter | Bit arrangement 1 | 2 | 4 | 8 | A | B |
|---|---|---|---|---|---|---|---|---|
| Data K | Data P | Numeral 1 | 1 | 0 | 0 | 0 | 0 | 0 |
| | | 2 | 0 | 1 | 0 | 0 | 0 | 0 |
| | | 3 | 1 | 1 | 0 | 0 | 0 | 0 |
| | | 4 | 0 | 0 | 1 | 0 | 0 | 0 |
| | | 5 | 1 | 0 | 1 | 0 | 0 | 0 |
| | | 6 | 0 | 1 | 1 | 0 | 0 | 0 |
| | | 7 | 1 | 1 | 1 | 0 | 0 | 0 |
| | | 8 | 0 | 0 | 0 | 1 | 0 | 0 |
| | | 9 | 1 | 0 | 0 | 1 | 0 | 0 |
| | 1st additional code | P* | 1 | 1 | 1 | 1 | | |
| | 2nd additional code | P** | | | 1 | 1 | | |
| | Data Q | Letter A | 1 | 0 | 0 | 0 | 1 | 0 |
| | | B | 0 | 1 | 0 | 0 | 1 | 0 |
| | | C | 1 | 1 | 0 | 0 | 1 | 0 |
| | | D | 0 | 0 | 1 | 0 | 1 | 0 |

TABLE 2

| Character number | Character arrangement 1 | 2 | 4 | 8 | A | B | | Byte number | Byte arrangement 1 | 2 | 4 | 8 | A | B | C | D | |
|---|---|---|---|---|---|---|---|---|---|---|---|---|---|---|---|---|---|
| 1c | $A_1$ | $A_2$ | $A_3$ | $A_4$ | 0 | 0 | Numeral (1c, 2c) → | 1b | $A_1$ | $A_2$ | $A_3$ | $A_4$ | $B_1$ | $B_2$ 9 | $B_3$ | $B_4$ | |
| 2c | $B_1$ | $B_2$ | $B_3$ | $B_4$ | 0 | 0 | Numeral (3c) → | 2b | $C_1$ | $C_2$ | $C_3$ | $C_4$ | 1 | 1 | 1 | 1 | Data R |
| 3c | $C_1$ | $C_2$ | $C_3$ | $C_4$ | 0 | 0 | Letter (4c) → | 3b | $D_5$ | $D_6$ | 1 | 1 | $D_1$ | $D_2$ | $D_3$ | $D_4$ | |
| 4c | $D_1$ | $D_2$ | $D_3$ | $D_4$ | $D_5$ | $D_6$ | | | | | | | | | | | |

For example, data K is composed of one character unit or, in other words, six bits (1, 2, 4, 8, A, B), where bit $a_1$ corresponds to 1, $a_2$ to 2, $a_3$ to 4, $a_4$ to 8, $a_5$ to A, and $a_6$ to B, respectively. Table 1 shows an example of data K. Data P represents numeral data in which two bits (A, B) are both "0" and the remaining four bits (1, 2, 4, 8) signify binary coded decimal notation. Data Q represents letter data in which at least one of the two bits (A, B) is "1" and the combination of four bits (1, 2, 4, 8) and two bits (A, B) represents one letter. The first additional code $P_=$ consists of four bits (1, 2, 4, 8) which are in all "1". Also, the second additional code $P_{==}$ is composed of two bits (4, 8) which are in all "1." In Table 2, data R is one byte and consists of eight bits (1, 2, 4, 8, A, B, C, D).

Table 2 shows the relationship between characters and bytes. Every two sequential numerals expressed by character Nos. 1*c* and 2*c* are packed and converted into one byte as indicated in byte No. 1*b*. Excess numeral data (No. 3*c*), which is produced when the above-mentioned packing operation was performed, is converted into byte data shown in No. 2*b* having four bits (A, B, C, D) which are in all "1", and four bits (1, 2, 4, 8) for representing numeral data. Letter data (No. 4*c*) is converted into byte data shown in No. 3*b* having two bits (4, 8) which are in all "1" and six bits (1, 2, A, B, C, D) for repressing letter data. For conversion from byte to character, two numeral data (Nos. 1*c* and 2*c*) are separately derived from byte data (No. 1*b*) when both all the four bits (A, B, C, D) in the byte are not "1" and all the two bits (4, 8) are not "1". One numeral data (No. 3*c*) is derived therefrom when all the four bits (A, B, C, D) are in "1" and all the two bits (4, 8) are not "1" as shown in byte data (No. 2*b*). Furthermore, when two bits (4, 8) are in all "1", as shown in byte data No. 3*b*, one letter data (i.e., character No. 4*c*) is taken out. Table 3 shows one example of the specific character and byte arrangement related to Table 2.

TABLE 3

| Character number | Example of data | 1 | 2 | 4 | 8 | A | B |
|---|---|---|---|---|---|---|---|
| 1c | 9 | 1 | 0 | 0 | 1 | 0 | 0 |
| 2c | 6 | 0 | 1 | 1 | 0 | 0 | 0 |
| 3c | 3 | 1 | 1 | 0 | 0 | 0 | 0 |
| 4c | A | 1 | 0 | 0 | 0 | 1 | 0 |

(Character number and example of data; Character arrangement)

| Byte number | Example of data | 1 | 2 | 4 | 8 | A | B | C | D |
|---|---|---|---|---|---|---|---|---|---|
| 1b | 9 and 6 | 1 | 0 | 0 | 1 | 0 | 1 | 1 | 0 |
| 2b | 3 | 1 | 1 | 0 | 0 | 1 | 1 | 1 | 1 |
| 3b | A | 1 | 0 | 1 | 1 | 1 | 0 | 0 | 0 |

(Byte number and example of data; Byte arrangement)

It is assumed that each data is composed of a character unit, and that whole data for use in a computer include *a*-number of numerical data and *b*-number of letter data. Then, the total of numerical data and letter data is:

$$a+b \qquad (1)$$

Since the ratio $x$ of each letter data to the entire data is given by $(b/(a+b)$, each letter data appears according to the following statistically derived equation of function $f(x)$:

$$f(x)=(1-x)^2 \qquad (2)$$

Hence, b-number of letter data are separated as follows:

$$b(1-x)^2 \qquad (3)$$

When each letter data appears after odd turn of the numerical data, excess numerical data is produced. The probability of the occurrence of each excess numerical data, or, in other words, the probability of the occurrence of each letter data after an odd turn or an even turn of numerical data, is ½.

The number of excess numerical data is determined by the number of separated letter data and is given by:

$$\tfrac{1}{2}b(1-x)^2 \qquad (4)$$

It follows, therefore, that if every two serial numerical data are packed into one byte data (eight bits), the number of serial numerical data to be packed is given by:

$$a-\tfrac{1}{2}b(1-x)^2 \qquad (5)$$

In other words, the number of byte data is, as shown in the following equation (6), half the number given by equation (5);

$$\tfrac{1}{2}[a-\tfrac{1}{2}b(1-x)^2] \qquad (6)$$

Therefore, the number of byte data which are required for a-number of numerical data and b-number of letter data is determined, as shown in equation (7), according to equations (4) and (6) as:

$$\tfrac{1}{2}[a-\tfrac{1}{2}b(1-x)^2]+[\tfrac{1}{2}b(1-x)^2+b]=\tfrac{1}{2}a+\tfrac{1}{4}b(1-x)^2+b \qquad (7)$$

The bit density $g(x)$ in the data conversion from six bits (one character) into eight bits (one byte) according to this invention is given by equation (9) obtained by dividing the following equation (8) as a result of the multiplication of equation (7) by equation (8):

$$6(a+b) \qquad (8)$$

$$g(x)=\frac{6(a+b)}{8[1/2a+1/4b(1-x)^2+b]}=\frac{3}{2(1-x)+x(1-x)^2+4x} \qquad (9)$$

The invention can be better understood by referring to the accompanying drawings in which.

Figure 1:
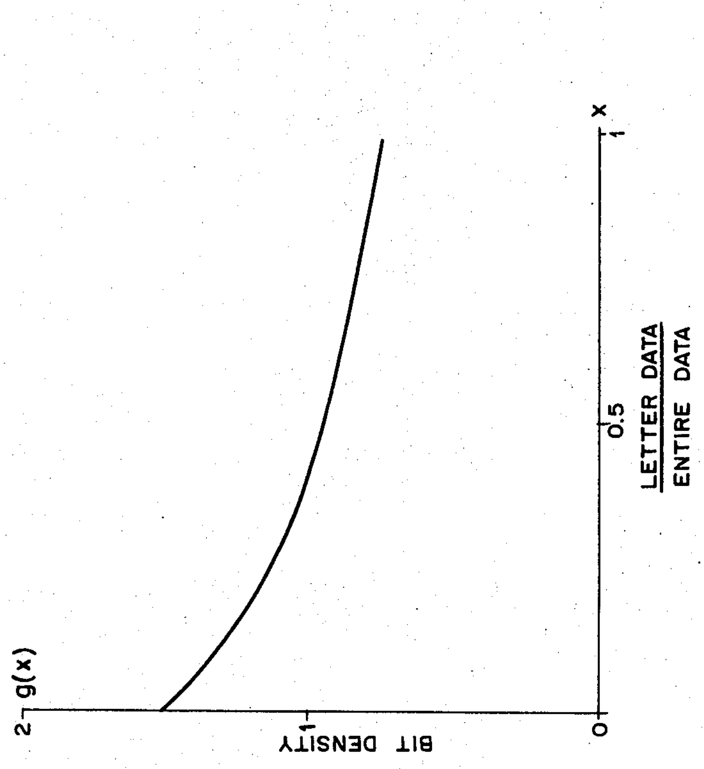
FIG. 1 is a graph illustrating the relationship between the bit density and the ratio of letter data to whole data to be processed in the data converter of this invention.

FIG. 1 shows a graph representing the relationship between the bit density and the ratio of letter data to the entire data according to the data conversion method and apparatus of this invention. In FIG. 1, the bit density "1" shows the facts and six bits (character) are converted into six bits (character) and that eight bits (byte) are converted into eight bits (byte). More specifically, FIG. 1 shows a graph representing equation (9).

Generally, the percentage of letter data in a computer is less than about 20 percent. According to this invention, the bit density can be significantly improved.

If each data sent from a central processor is converted into another data form in a peripheral control equipment including the data converter of this invention, and if another data is written into the external memory or read therefrom, the data processing speed is $h(x)$ times higher than that (assumed as "1") according to the prior art. This is easily inferred from equations (1) and (7). More particularly, by dividing equation (1) by equation (7), the data processing speed is given as follows:

$$h(x)=\frac{4}{2(1-x)+x(1-x)^2+4x} \qquad (10)$$

Figure 2:
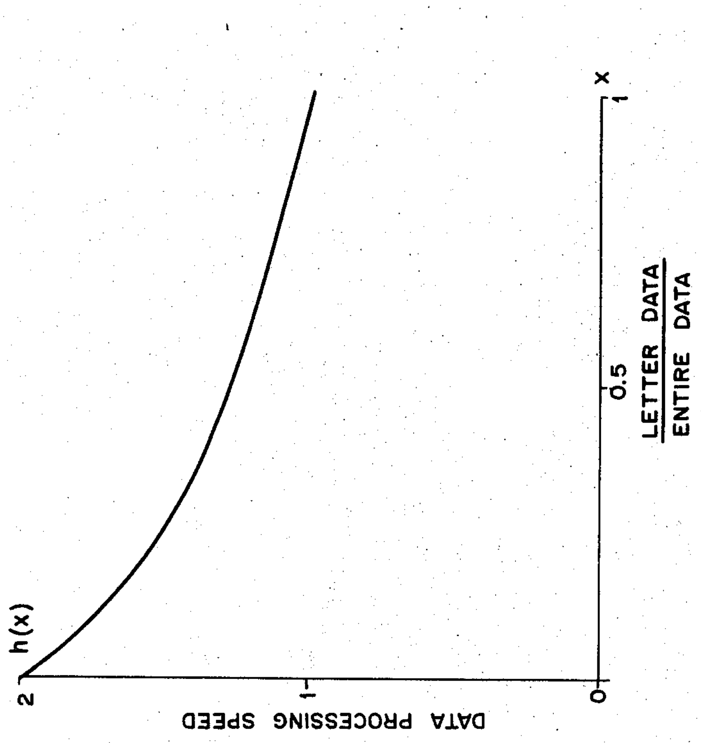
FIG. 2 is a graph illustrating the relationship between the data processing speed and the ratio of letter data to whole data to be processed in the system of this invention.

FIG. 2 shows a graph representing the relationship between the processing speed and the ratio of letter data to the entire data. It is apparent that the processing speed is 1.58 times higher than that in the prior art when the ratio is 20 percent.

Figure 3:
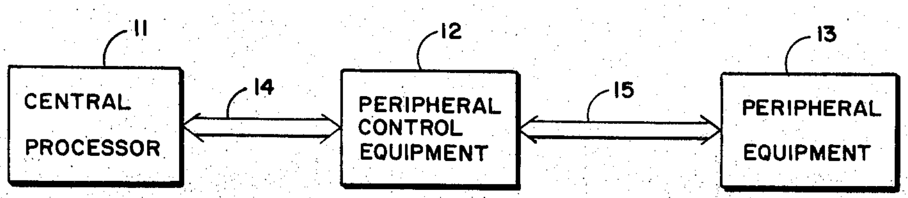
FIG. 3 is a schematic block diagram of a computer system including the data converter of this invention.

FIG. 3 shows a block diagram of the computer system including the data converter of this invention. In that computer, data is read out from a central processor 11 and converted into another data by a peripheral control equipment 12. Each data from control equipment 12 is written into a peripheral equipment 13 one by one. Data read out from peripheral equipment 13 is decoded, converted by peripheral control equipment 12, and then written into central processor 11. The data converter of this invention is included in peripheral control equipment 12. Data is transferred between central processor 11 and control equipment 12 through a signal line group 14, and between control equipment 12 and peripheral equipment 13 through a signal line group 15.

Figure 4:
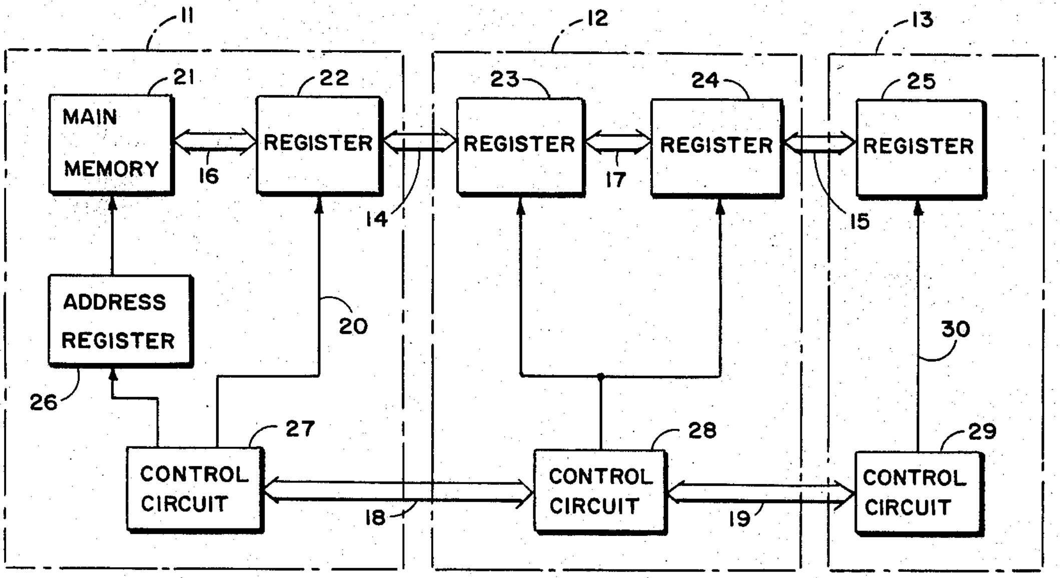
FIG. 4 is a more detailed block diagram of the computer system shown in FIG. 3.

In FIG. 4, which shows a block diagram of the computer system of FIG. 3 in detail, each data in a main memory 21 of the central processor 11 is read out to a register 22 through a signal line group 16, in a manner corresponding to an input-output channel, under the control of an address register 26 and a control circuit 27. Data in the register 22 of the central processor 11 is transferred to a register 23 of the peripheral control equipment 12 through signal line group 14 under the control of the control circuit 27, coupled by a line 20 to register 22, and a control circuit 28 of the equipment 12. When data is transferred from the register 23 to a register 24 by a signal line 17, group data is converted into another data by a data converting circuit in the register 23 under the control of the control circuit 28. Data is written from the register 24 into a register 25 of the equipment 13 through a signal line group 15 under the control of the control circuit 28 of equipment 12, and also by a control circuit 29 of equipment 13, control circuit 29 being coupled to register 25 by a line 30.

Data read out from equipment 13 is supplied to register 24 via register 25 through line group 15. For this reason, data is decoded by the data converting circuit in register 23 and is written through register 22 into the address in main memory 21 designated by address register 26.

Figure 5:
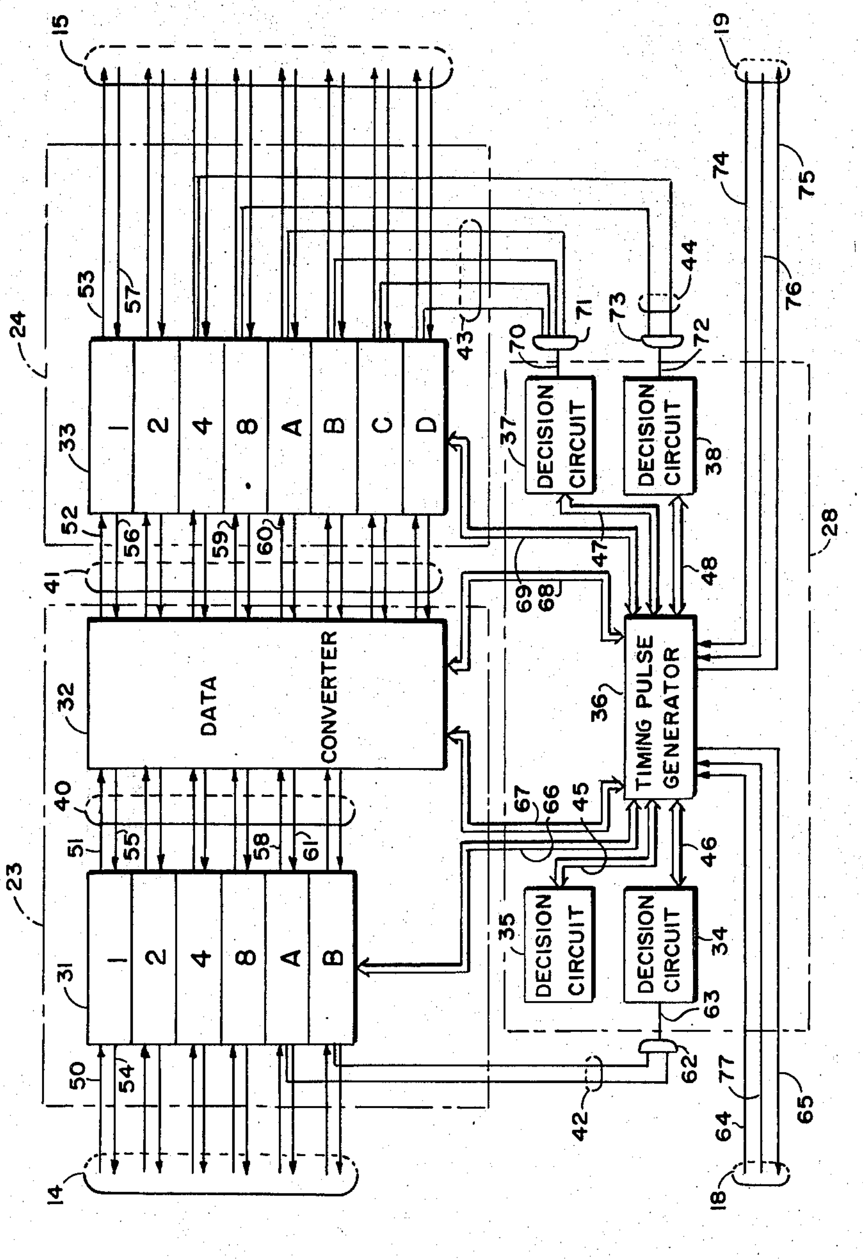
FIG. 5 is a block diagram of the data converter of this invention.

In FIG. 5, which shows a block diagram of one embodiment of this invention, the data converter in peripheral control equipment 12 comprises a register 31 coupled to a data converting circuit 32 and included in register 23 of FIG. 4, and a register 33 included in register 24 of FIG. 4. Control circuit 28 of equipment 12 includes a first decision circuit 34 coupled to register 31, a second decision circuit 35 coupled to an output timing pulse generating circuit 36, a third decision circuit 37, and a fourth decision circuit 38, both of which are respectively coupled between pulse generator 36 and selected stages of the register 33.

The register 31 for storing data of a character unit is structured by six stages or flip-flop circuits in the storage positions 1, 2, 4, 8, A and B, and register 33 for storing data of a byte unit is composed of 8 stages or flip-flop circuits in the storage positions 1, 2, 4, 8, A, B, C and D. The data converting circuit 32 converts data from a character (six bits) to a byte (eight bits) and vice versa, and decision circuit 34 discriminates through a signal line group 42 numerical data when both two bits (A, B) in the storage positions of register 31 storing data of a character unit are "0". The decision circuit 35 is employed to pack numerical data every even number, and decision circuit 37 discriminates, through a signal line group 43, whether all four bits (A, B, C, D) of byte unit data stored in register 33 are "1". The decision circuit 38 discriminates through a signal line group 44 whether all two bits (4, 8) of the position of register 33 are "1". The timing pulse generating circuit 36 is driven by a signal supplied from central processor 11 via a signal line group 18, and controls the data conversion from character unit to byte unit when data is transferred from register 31 to register 33 through data converting circuit 32 in response to output signals of decision circuits 34 and 35. Moreover, pulse generating circuit 36 is driven by a signal applied from peripheral equipment 13 and controls the data conversion from byte unit into character unit when data is transferred from register 33 to register 31 through data converter circuit 32 in response to output signals of decision circuits 37 and 38.

The operations of the circuits of FIGS. 5 and 6A will be described with reference to the time-charts of FIGS. 11 and 12.

Figure 6A:
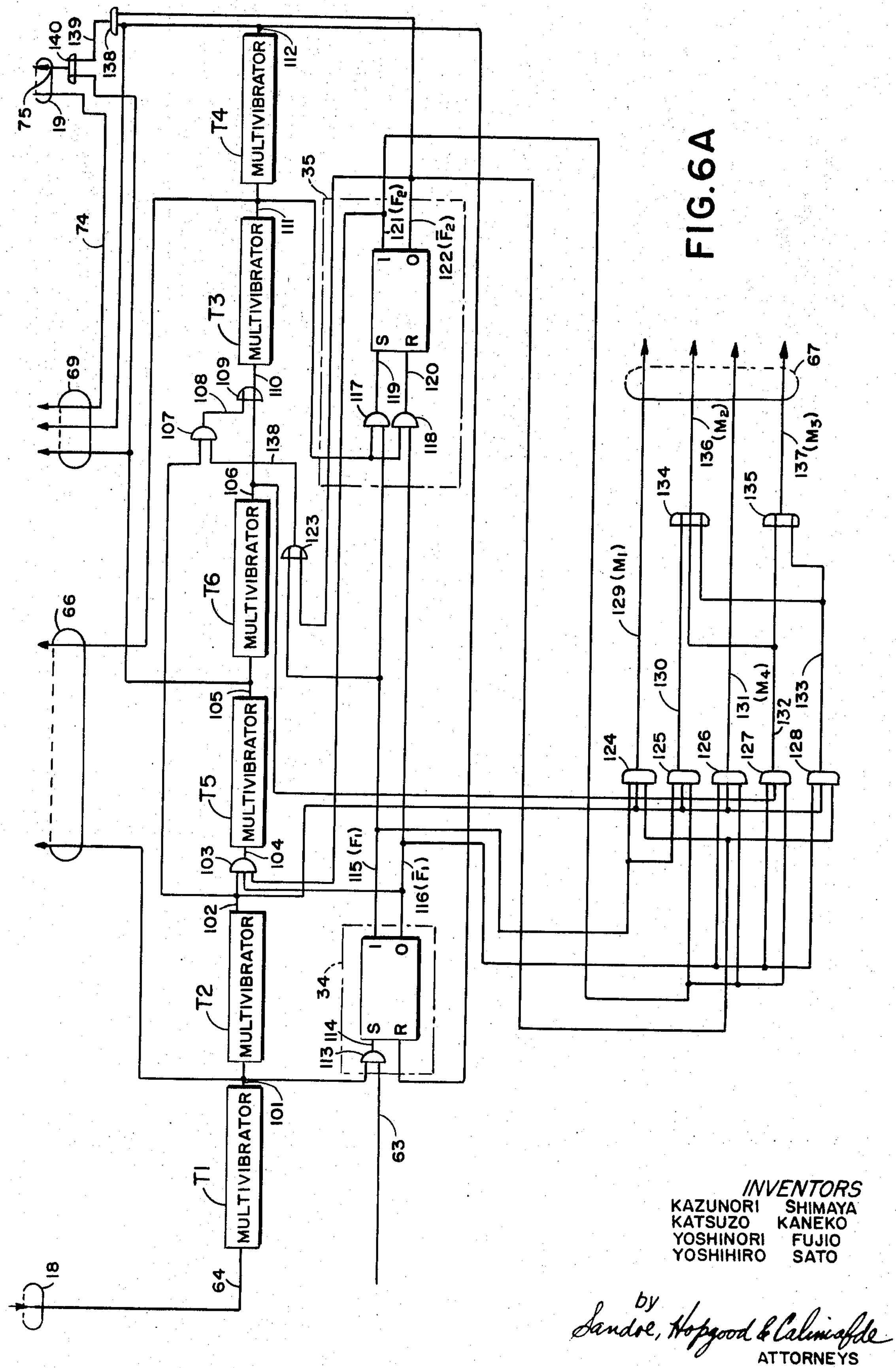
FIG. 6A is a schematic diagram showing in greater detail the decision circuits and the output timing pulse generating circuit shown in FIG. 4.

In FIG. 6A, multivibrators T1, T2, T3, T4, T5 and T6 are employed to cause pulse generating circuit 36 to generate output timing pulses in a predetermined sequence. In FIGS. 11 through 12, a waveform T1' denotes an output one of the multivibrator T1. This output waveform is set during a predetermined time interval by the leading edge of a waveform T0 supplied through a signal line 64. A waveform T2' is an output one of the multivibrator T2 which is set during a predetermined time interval by the trailing edge of the waveform T1'. A waveform T3' is set by the trailing edge of the waveform T2' when decision circuit 34 is in the "on" state (set state) or decision circuit 35 is in the "off" state (reset state). The waveform T3' is set also by the trailing edge of a waveform T6' when decision circuit 34 is in the "off" state and the decision circuit 35 is in the "on" state, simultaneously. A waveform T4' is set by the trailing edge of the waveform T3' and a waveform T5' is set by the trailing edge of the waveform T2' when decision circuit 34 is in the "off" state and decision circuit 35 is in the "on" state. A waveform T6' is set by the trailing edge of the waveform T5'. The waveform T1' is used for setting character unit data provided from central processor 11 (FIG. 2) to register 31.

The waveforms T2' and T6' are used for converting character unit data sent from register 31 to register 33 into byte unit data and for setting the converted data into register 33. As indicated in a waveform $F_1$, decision circuit 34 is set by the waveform T1' when numerical data is detected in register 31, and is reset upon receipt of the waveform T4'. The waveform T3' is for use in resetting register 31 and for shifting the decision circuit 35. As shown in waveform $F_2$, decision circuit 35 is shifted upon receipt of the waveform T3'. The decision circuit 35 repeats on-off operation at each shift operation. This shift operation, however, is effected only when decision circuit 34 is in the "on" state. When decision circuit 34 is in the "off" state, decision circuit 35 is reset by the waveform T3'.

More specifically, the decision circuit 35 is turned "off" by the waveform T3' whenever decision circuit 34 is in the "off" state. To the contrary, when decision circuit 34 is in the "on" state, decision circuit 35 performs a shift operation. In other words, decision circuit 35 turns "on," upon receipt of the waveform T3', if the previous state is "off," and is turned to the "off" state, upon receipt of the waveform T3, if the previous state is "on." The initial state of decision circuit 35 is "off." When the waveform T4' is supplied to register 33 and simultaneously, decision circuit 35 is in the "off" state or when the waveform T5' is supplied to the register 33, byte data in register 33 is transferred to register 25 of the peripheral equipment 13 (FIG. 4). After this, the data conversion completion signal is produced from equipment 13 through a signal line 74, and register 33 is reset. Table 4 that follows shows the condition of data transfer from register 31 to register 33.

TABLE 4

| Character Unit Data at Register **31** | character decision condition | Control signal of Data converting circuit (FIG. **9**) | Set Pulse to register **33** | Storage Position in Register **33** |
|---|---|---|---|---|
| numerical in odd turn (No. **1**c in Table **2**) | $F_1 \cdot \overline{F}_2$ | $M_1$ | T2' | numeral (**1, 2, 4, 8**) |
| numerical in even (No. **2**c in Table **2**) | $F_1 \cdot F_2$ | $M_2$ | T2' | numeral (A, B, C, D) |
| letter following numerical in odd turn (No. **4**c in Table **2**) | $\overline{F}_1 \cdot F_2$ | $M_4$ | T2' | first additional code all "**1**", (A, B, C, D) |
| | | $M_2$& $M_3$ | T6' | letter (**1, 2,** A,B,C,D) & second additional code all "**1**," (**4,8**) |
| letter following numerical in even turn or following letter | $\overline{F}_1 \cdot \overline{F}_2$ | $M_2$& $M_3$ | T2' | letter (**1,2,** A,B,C,D) & second additional code all "**1**", (**4, 8**) |

In Table 4, the first one of two serial numerical data is referred to as "numerical in odd turn," and the second one to "numerical data in even turn."

The operation of data conversion from the character data of No. 3*c* (example of data: numeral 3) and the character data of No. 4*c* (example of data: letter A) into byte data of No. 2*b* and No. 3*b*, respectively (as shown in Table 3) will be described by referring to FIGS. 4, 5, 6A, 7, 8, 9 and 12 in detail.

In order to send data from register 22 of central processor 11 to register 23 of peripheral control equipment 12, a signal is supplied to register 22 from control circuit 27 through a signal line 20 and, at the same time, the data conversion starting signal T0 is applied to control circuit 28 of control equipment 12 through signal line group 18 (FIG. 4). As a result, data stored in register 22 is sent to register 23 through signal line group 14. The multivibrator T1 (FIG. 6A) of output timing pulse generating circuit 36 of control circuit 28 generates the waveform T1' (FIG. 12), upon receipt of the signal T0 through the signal line 64 included in signal line group 18. This waveform T1' is applied to register 31. through a signal line 101 (FIG. 6A) of signal line group 66 (FIG. 5). For this reason, character unit data No. 3*c* (example of data: numeral 3) in Table 3 applied from register 22 (FIG. 4) is stored in the storage positions (1, 2, 4, 8, A, B) of register 31 (FIG. 5) through signal line group 14. More specifically, data (1, 1, 0, 0, 0, 0) is stored, respectively, in the storage positions (1, 2, 4, 8, A, B) of register 31.

Figure 7:
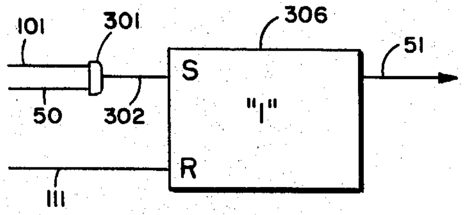
FIG. 7 is a circuit diagram of a part of a register shown in FIG. 5.

FIG. 7 shows the storage position "1" of register 31. The output waveform T1' of multivibrator T1 of FIG. 6A is applied to an AND gate 301 of FIG. 7 through signal line 101 and, at the same time, the bit corresponding to the storage position "1" of register 31 storing character No. 3*c* in Table 3 is supplied to AND gate 301 via a signal line 50 in signal line group 14 (FIG. 5). Therefore, AND gate 301 opens its gate to set a flip-flop 306 through a signal line 302. The flip-flop 306 produces an output in a signal line 51. Moreover, the output waveform T1' of the multivibrator T1 is sent to an AND gate 113 through signal line 101. Under this state, both the storage positions A and B of register 31 (FIG. 5) are set at the "0" state. Consequently, two 0-side output signals "1" of the flip-flops corresponding to the storage positions A and B appear at signal line group 42, and an AND gate 62 receives a signal indicating numerical data and opens its gate. For this reason, the AND gate 62 produces an output signal in a signal line 63. Thus, an AND gate 113 (FIG. 6A) is opened, and the flip-flop of decision circuit 34 supplied with an output signal via a signal line 114 is set to the "1" state.

The multivibrator T2 receives an output signal from the multivibrator T1 through signal line 101 and generates the output waveform T2'. The output waveform T2' is applied to AND gates 124, 125, 126, 127 and 128 through a signal line 102. Since the flip-flop of decision circuit 34 is set to the "1" state, the output waveform $F_1$ produced in a signal line 115 is set at the "1" state. An output waveform $\overline{F}_2$ produced in a signal line 122 is in the "1" state, because decision circuit 35 remains in the "0" state (namely, decision circuit 35 is in its initial or "0" state). Accordingly, AND gate 124 is opened to generate an output signal $M_1$ which serves to set character data (1, 1, 0, 0, 0, 0) stored through a signal line 129 of signal line group 67 in register 31 to the storage position (1, 2, 4, 8) of register 33 (FIG. 5) through data converting circuit 32. For example, an input signal is sent to an AND gate 401 (FIG. 9) via signal line 51 of signal line group 40, and the output signal $M_1$ is also applied to AND gate 401. Consequently, AND gate 401 is opened to produce an output signal in a signal line 52 of signal line group 41.

Figure 8:
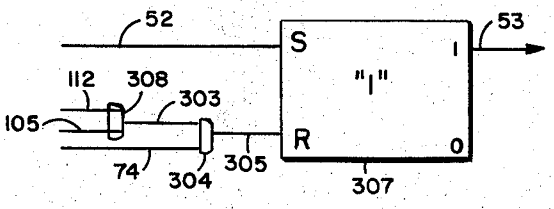
FIG. 8 is a circuit diagram of a part of a register shown in FIG. 5.
Figure 9:
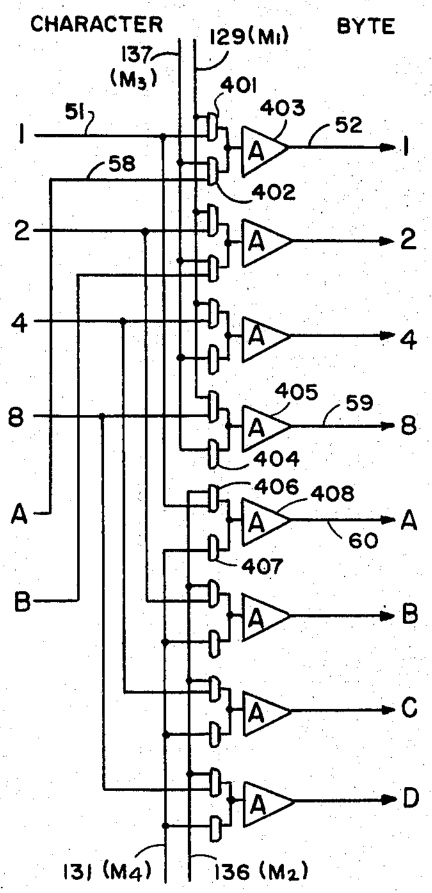
FIGS. 9 and 10 are schematic diagrams illustrating in detail a data converting circuit shown in FIG. 5.

This output signal is applied to register 33, and thus data in the storage positions (1, 2, 4, 8) of register 31 is respectively set to the storage positions (1, 2, 4, 8) of register 33. FIG. 8 shows the storage position "1" of register 33. Therefore, a flip-flop 307 is set to the "1" state through signal line 52 to produce an output in a signal line 53 included in a signal line group 15 coupled between control equipment 12 and peripheral equipment 13 (FIG. 3).

The output waveform T2' of the multivibrator T2 is supplied to an AND gate 107 through signal line 102. Also, because the flip-flop of decision circuit 34 is set at the "1" state, an OR gate 123 is opened through the signal line 115, and its output signal is supplied to the AND gate 107 through a signal line 138. As a result, AND gate 107 opens and multivibrator T3 receives a signal from AND gate 107 through a signal line 108, an OR gate circuit 109, and a signal line 110, thereby generating an output waveform T3'. The output waveform T3′ serves as the set signal for decision circuit 35 through a signal line 111 of the signal line group 66 (FIG. 5) and as the reset signal for register 31 through signal line 111.

Furthermore, the output waveform T3′ is supplied to an AND gate 117. On the other hand, since the flip-flop of decision circuit 34 is in the "1" state and AND gate 117 is opened, the flip-flop of decision circuit 35 is brought to the "1" state through a signal line 119. The output waveform T3′ resets register 31 (FIG. 5) to the "0" state. For instance, a reset signal through signal line 111 of the signal line group 66 is applied to the storage position "1" of register 31 (FIG. 7) and a flip-flop 306 is reset to the "0" state. The multivibrator T4 receives an output waveform T3′ from the multivibrator T3 through the signal line 111 and generates the output waveform T4′. The waveform T4′ resets the flip-flop of decision circuit 34 to the "0" state by way of a signal line 112.

When the data conversion starting signal is produced again from central processor 11 (FIG. 4) to signal line 64 of signal line group 18, the multivibrator T1 of pulse generating circuit 36 generates the waveform T1′. Date of No. 4*c* (example data: letter A) in Table 3 is stored in the storage positions (1, 2, 4, 8, A, B) of register 31. In other words, data (1, 0, 0, 0, 1, 0) is stored, respectively, in the storage positions (1, 2, 4, 8, A, B) of register 31. The multivibrator T2 receives the output signal T1′ from the multivibrator T1 and produces the output waveform T2′. Under this state, a waveform $\overline{F}_1$ of the 0-side output "1" of the flip-flop of decision circuit 34 is sent to AND gates 126, 127 and 128 through a signal line 116, because the flip-flop of decision circuit 34 is reset to the "0" state. In addition, the flip-flop of decision circuit 35 is set to the "1" state and, therefore, the waveform $F_2$ (of the set side output "1") of the flip-flop is supplied to AND gates 125, 126 and 127 through a signal line 121. For this reason, AND gate 126, which receives the output waveform T2′ through the signal line 102 is opened to generate an output waveform $M_4$ which is sent through a signal line 131 of signal line group 67 to data converting circuit 32. For this reason, data (1, 1, 1, 1) is set to the storage positions (A, B, C, D) of register 33. For example, since the output signal $M_4$ is applied to an AND gate 407, that AND gate is opened to produce an output signal in a signal line 60 of signal line group 41 through an amplifier 408.

The output signal is transmitted to register 33. Thus, data (1, 1, 1, 1) is set into the storage positions (A, B, C, D) of register 33. The output waveform T2′ of the multivibrator T2 (FIG. 6A) is applied to an AND gate 103 through signal line 102. Furthermore, a signal $\overline{F}_1$ of the flip-flop of decision circuit 34 is applied to an AND gate 103 through the signal line 116, and the signal $F_2$ of the flip-flop of decision circuit 35 is applied to AND gate 103 through signal line 121, simultaneously. Therefore, AND gate 103 is opened, and the multivibrator T5 is set through a signal line 104 to generate an output waveform T5′.

The waveform T5′ is given to an OR gate 140 through a signal line 105 and to the control circuit 29 of peripheral equipment 13 through a signal line 75 of signal line group 19 extending between control circuit 29 and control circuit 28 in control equipment 12 (FIG. 4).

Upon receipt of this signal, control circuit 29 sends a signal through a signal line 30 for setting byte data in register 24 to the register 25 through signal line group 15. Consequently, data (1, 1, 0, 0, 1, 1, 1, 1) stored in the storage positions (1, 2, 4, 8, A, B, C, D) of register 33 is set into register 25. After the set operation is completed, a data conversion ending signal is applied to control circuit 28 of control equipment 12 through a signal line 74 of signal line group 19. The data conversion ending signal is for use for resetting register 33 through signal line 74 of signal line group 69. For example, the storage position signal "1" of register 33 (FIG. 8) is applied to an OR gate 308 through signal line 105 of the signal line group 69. The signal is then applied to an AND gate 304 through a signal line 303. AND gate 304, upon receipt of the data conversion ending signal, opens and flip-flop 307 is reset to the "0" state through a signal line 305. The multivibrator T6 receives the output waveform T5′ from the multivibrator T5, thereby generating the output waveform T6′. The output waveform T6′ is sent to AND gate 127 through a signal line 106. As a result, AND gate 127 opens to generate an output signal $M_3$ in a signal line 137 through a signal line 132 and an OR gate 135.

Simultaneously, an output signal $M_2$ is produced in a signal line 136 through signal line 132 and an OR gate circuit 134. These output signals $M_2$ and $M_3$ serve as signals for setting data (1, 0, 0, 0, 1, 0) of No. 4*c* in Table 3 of register 31 to the storage positions (1, 2, 4, 8, A, B, C, D) of register 33 (FIG. 5) through data converting circuit 32, and signal lines 136 and 137, respectively. For example, because an input signal is supplied to an AND gate 406 through signal line 51 of signal line group 40, AND gate 406 opens, whereby an output signal is produced in signal line 60 through amplifier 408. The output signal $M_3$ is applied to an AND gate 404, which is opened to generate an output signal in signal line 59 through an amplifier 405. This output signal is applied to register 33 through signal line group 41.

Thus, letter data A (1, 0, 0, 0, 1, 0) in the storage positions (1, 2, 4, A, B) of register 31 is set into the storage positions (1, 2, 4, 8, A, B, C, D) of register 33 in the form of a byte unit data (1, 0, 1, 1, 1, 0, 0, 0) through circuit 32. The output waveform T6′ of the multivibrator T6 sets the multivibrator T3 through signal line 106, OR gate 109, and signal line 110 to produce an output waveform T3′. The output waveform T3′ is used as a signal for resetting decision circuit 35 and register 31 through signal line 111. Also, the output waveform T3′ is supplied to an AND gate 118, and an output waveform $\overline{F}_1$ of the flip-flop of decision circuit 34 is sent to AND gate 118 through a signal line 116 and, therefore, AND gate 118 is opened by the output waveform T3′, and the flip-flop of decision circuit 35 is reset to the "0" state through a signal line 120.

Upon receipt of the output waveform T3′ from the multivibrator T3, the multivibrator T4 produces the output waveform T4′ through signal line 111. The waveform T4′ is applied to an AND gate 138 through a signal line 112. Likewise, the flip-flop of decision circuit 35 is reset to the "0" state and, therefore, the output waveform $\overline{F}_2$ is transmitted to AND gate 138 through a signal line 122. As a result, AND gate 138 is opened to produce an output signal in signal line 75 included in signal line group 19 through a signal line 139 and an OR gate 140. In response to the output signal, byte unit data (1, 0, 1, 1, 1, 0, 0, 0) in the storage positions (1, 2, 4, 8, A, B, C, D) of register 33 is set into register 25. After the completion of the setting operation, register 33 in register 24 receives the data conversion ending signal from control circuit 29 through signal line 74 and, as a result, register 33 is reset.

Figure 11:
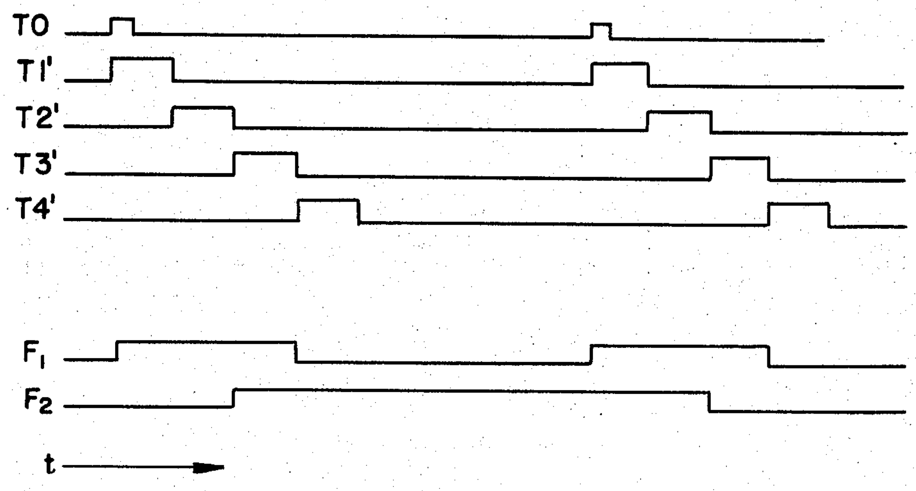
FIGS. 11, 12, 13 and 14 are time-charts of the output waveforms appearing at each circuit of the data converter of this invention when the data converting operation is performed.
Figure 12:
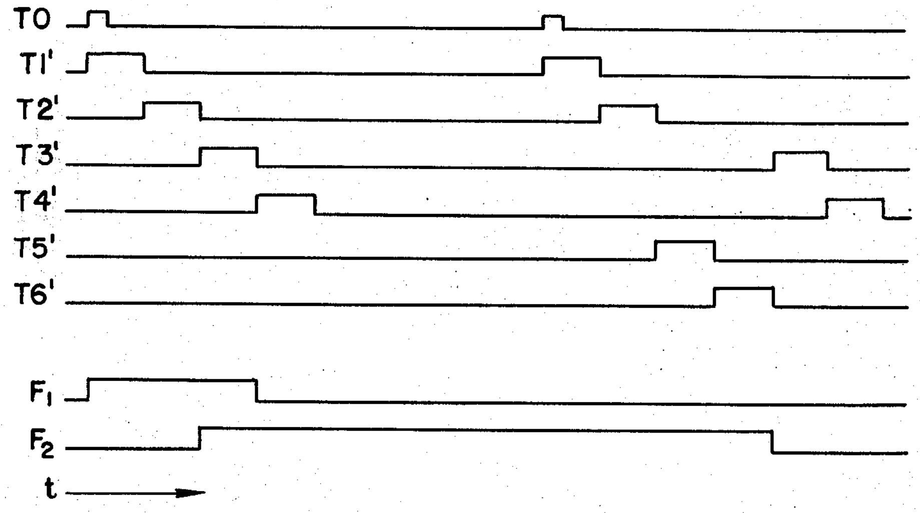

FIG. 11 is a signal time chart illustrating data conversion when numerical data 9 and 6 of the character unit shown in Nos. 1*c* and 2*c* in Table 3 are converted into byte unit data represented by No. 1*b* in Table 3.

As has been mentioned above, data stored in register 22 is applied to register 23 when the data conversion starting signal T0 is applied to control circuit 28 from control circuit 27 (FIG. 4). In FIG. 6A, upon receipt of the signal T0, the multivibrator T1 generates the waveform T1'. Data of No. 1*c* (example of data: numeral 9) in Table 3 applied from register 22 is stored in the storage positions (1, 2, 4, 8, A, B) of register 31 which is supplied with the waveform T1. More particularly, data (1, 0, 0, 1, 0, 0) is respectively stored in the storage positions (1, 2, 4, 8, A, B) of register 31. In addition, the output waveform T1' of the multivibrator T1 is applied to AND gate 113. Under this state, both the storage positions A and B of register 31 (FIG. 5) stand at the "0" state. As a result, an output signal representing numerical data is produced in signal line 63 through AND gate 62. For this reason, AND gate 113 is opened, and the flip-flop circuit of decision circuit 34 is brought to the "1" state. The multivibrator T2 generates the output waveform T2' in response to the output signal from the multivibrator T1. At this time, the flip-flop circuit of decision circuit 34 stands at the " 1" state and the output waveform $F_1$ produced in signal line 115 is changed to the "1" state. Also, since decision circuit 35 is still in the "0" state, the output waveform $\overline{F}_2$ produced in a signal line 122 is established at the "1" state. As a consequence, AND gate 124 is opened to produce the output signal $M_1$ in a signal line 129. The signal $M_1$ serves as a signal for setting character unit data (1, 0, 0, 1, 0, 0) forming numerical data stored in register 31 into the storage positions (1, 2, 4, 8) of register 33 in FIG. 5 through data converting circuit 32. In other words, numerical data in the storage positions (1, 2, 4, 8) of register 31 is set into the storage positions (1, 2, 4, 8) of register 33. The output waveform T2' of the multivibrator T2 is supplied to AND gate 107, and the set-side output signal "1" of the flip-flop of decision circuit 34 is applied to AND gate 107. As a result, AND gate 107 opens to generate an output signal. The multivibrator T3 receives this output signal, thereby generating the output waveform T3'. The waveform T3' and the set-side output signal "1" (of the flip-flop circuit) of decision circuit 34 are applied to AND gate 117 which accordingly opens, and the flip-flop circuit of circuit 35 is set to the "1" state. The output waveform T3' resets register 31 to the "0" state and the multivibrator T4 receives the output waveform T3' from the multivibrator T3, and produces the output waveform T4'. The output waveform T4' resets the flip-flop circuit of decision circuit 34 to the " 0" state.

When the data conversion starting signal T0 is again received from processor equipment 11, the multivibrator T1 of timing pulse generating circuit 36 of control circuit 28 generates the waveform T1'. Data of No. 2*c* (example of data: numeral 6) in Table 3 is stored in the storage positions (1, 2, 4, 8, A, B) of register 31. In addition, data (0, 1, 1, 0, 0, 0) is stored respectively in the storage positions (1, 2, 4, 8, A, B) of register 31. Since the storage positions A and B of register 31 (FIG. 5) are both set in the "0" state, an output signal representing numerical data is produced, and the flip-flop circuit of decision circuit 34 is set to the "1" state. The multivibrator T2 receives an output signal from the multivibrator T1, thereby generating the output waveform T2'. For this reason, the flip-flop circuit of decision circuit 34 is in the "1" state. Therefore, the output waveform $F_1$ produced in a signal line 115 is in the "1" state. Also, the flip-flop circuit of decision circuit 35 is in the "1" state, and the waveform $F_2$ of the set-side output signal "1" is produced in signal line 121. For this reason, an AND gate 125 is opened by the output waveform T2', and the output waveform $M_2$ is produced in signal line 136 through a signal line 130 and OR gate 134. The output signal $M_2$ is supplied to data converter circuit 32 through signal line 136 of signal line group 67. Therefore, numerical data in the storage positions (1, 2, 4, 8) of register 31 is set into the storage positions (A, B, C, D) of register 33 (FIG. 5) through circuit 32. AND gate 107 receives the output waveform T2' from the multivibrator T2 and the set-side output signal "1" from decision circuit 34, thereby generating an output signal. Upon receipt of this output signal, the multivibrator T3 generates the output T3'. The AND gate 117 opens in response to the output waveform T3' and the set-side output signal "1" of decision circuit 34. As a result, the flip-flop of decision circuit 35 is reset to the "0" state. At the same time, the output waveform T3' resets register 31. The output waveform T3' from the multivibrator T3 is applied to the multivibrator T4. Therefore, the multivibrator T4 generates an output waveform T4' which in turn resets the flip-flop of decision circuit 34 to the "" state. Also, the output waveform T4' is supplied to AND gate 138, and simultaneously, the reset-side output signal of decision circuit 35 (the output waveform $F_2$) is sent to AND gate 138. As a result, AND gate 138 is opened to produce an output signal in signal line 75.

In response to the output signal, byte unit data (1, 0, 0, 1, 0, 1, 1, 0) in the storage positions (1, 2, 4, 8, A, B, C, D) of register 33 is set into register 25. After this setting operation, register 33 receives the data conversion ending signal from control circuit 29 through the signal line 74. As a result, register 33 is reset.

Figure 6B:
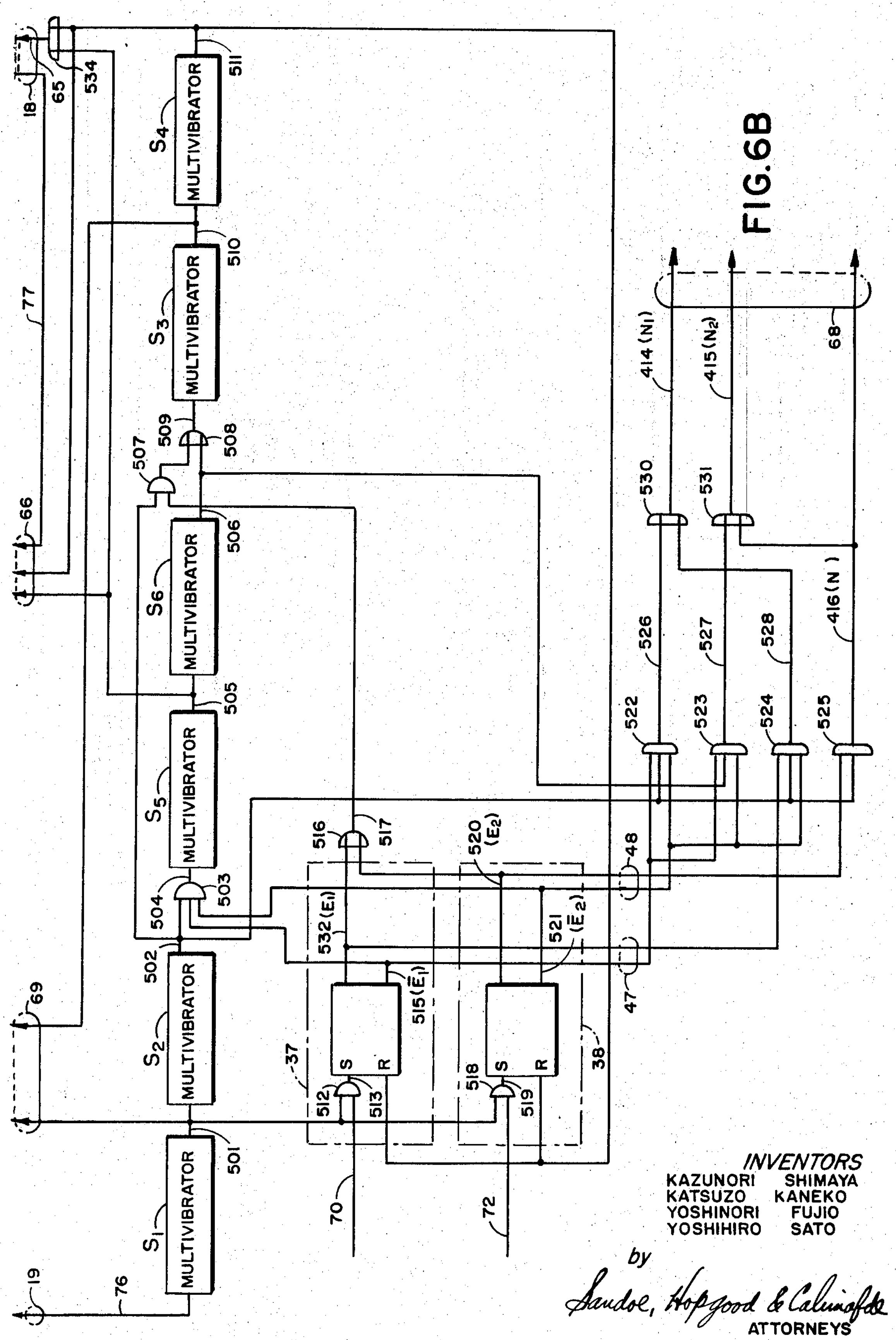
FIG. 6B is a schematic diagram showing in greater detail the decision circuits and the pulse generating circuit shown in FIG. 4.
Figure 13:
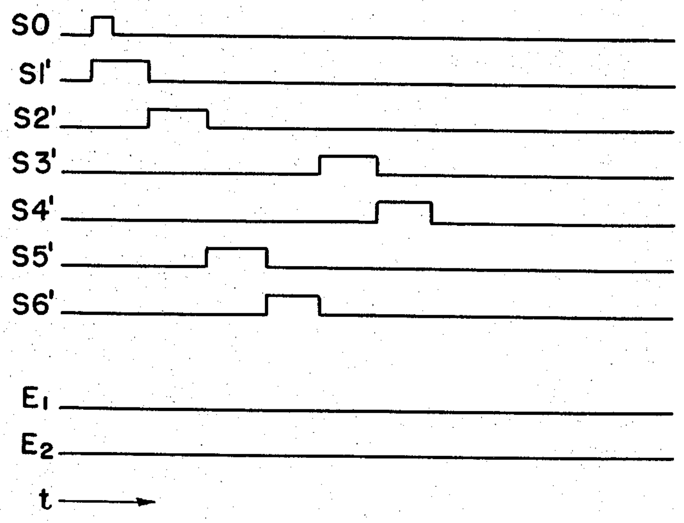
Figure 14:
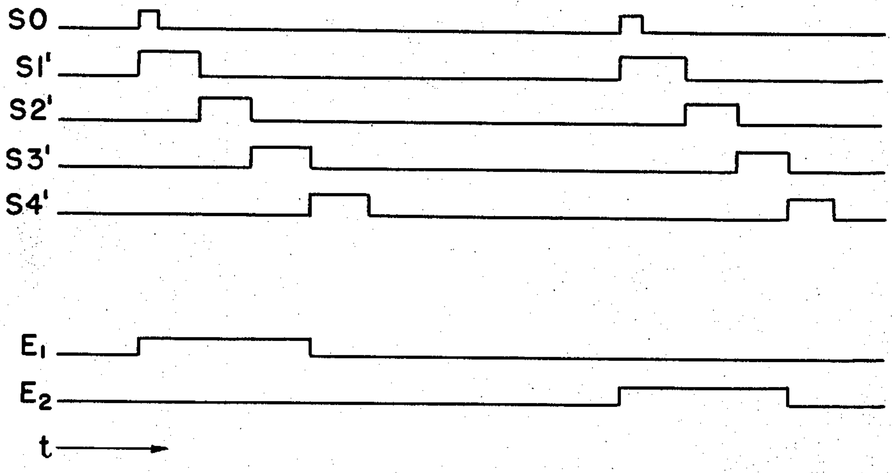

FIGS. 13 and 14 are signal time-charts showing the output waveforms appearing in the circuits of FIGS. 5 and 6B when data is transferred from register 33 to register 31 or, in other words, data is converted from byte unit into character unit.

The data converting operation will be described in greater detail by referring to the time-charts shown in FIGS. 13 and 14 and the circuits shown in FIGS. 5 and 6B.

In FIG. 6B, multivibrators S1, S2, S3, S4, S5 and S6 are used for causing pulse generating circuit 36 to generate output timing pulses in a predetermined sequence. A waveform S1′ shown in FIGS. 13 and 14 is an output one of the multivibrator S1 which is set during a predetermined time interval by the leading edge of a waveform S0 applied from a signal line 76. A waveform S2′ is the output waveform of the multivibrator S2 which is set during a predetermined time interval by the trailing edge of the waveform S1′. A waveform S3′ is set by the trailing edge of the waveform S2′ when decision circuit 37 is in the "on" state (set state) or decision circuit 38 is in the "on" state (set state). In addition, the waveform S3′ is set by the trailing edge of a waveform S6′ when both decision circuit 37 is in the "off" state and decision circuit 38 is in the "off" state. A waveform S4′ is set by the trailing edge of the waveform S3′ and a waveform S5′ is set by the trailing edge of the waveform S2′ when both circuit 37 is in the "off" state and circuit 38 is in the "off" state. The waveform S6′ is set by the trailing edge of the waveform S5′.

The waveform S1′ is used for setting byte unit data supplied from peripheral equipment 13 to register 33. The waveforms S2′ and S6′ are for use in converting byte unit data sent from the register 33 into character unit data and in setting this data into register 31. As indicated in a waveform $E_1$, decision circuit 37 is set by the waveform S1′ when the data storage positions (A, B, C, D) of register 33 are all in the "1" state, and is reset by the waveform S4′. The waveform S3′ is employed to reset register 33. As shown in a waveform $E_2$, decision circuit 38 is set by the waveform S1′ to produce an output waveform $E_2$ when both the storage positions (4, 8) of register 33 are in the "1" state. Upon receiving the waveform S4′ through signal line groups 47 and 48, decision circuits 37 and 38 are reset to generate output waveforms $\overline{E}_1$ and $\overline{E}_2$, respectively. The waveforms S4′ and S5′ are used to send signals to control circuit 27 of central processor 11 through signal line 65 so that character unit data in register 31 may be set to register 22. After character unit data have been set in register 22, the data conversion ending signal is supplied to pulse generating circuit 36 through signal line 77. The circuit 36 gives an output through signal line group 66 to reset register 31. Table 5 that follows shows the condition of data transfer from register 33 to register 31.

TABLE 5

| Byte Unit Data At Register **33** | Byte decision condition | control signal of Data converting circuit (Fig. 10) | Set pulse to register 31 | Storage Position in Register **31** |
|---|---|---|---|---|
| numeral: 2 (No. 1b in Table 2) | $\overline{E}_1 \cdot \overline{E}_2$ | $N_1$ | S2′ | numeral, (1,2,4,8,A,B) |
| | | $N_2$ | S6′ | numeral, (1,2,4,8,A,B) |
| numeral pulse 1st additional code (No. 2b in Table 2) | $E_1 \cdot \overline{E}_2$ | $N_1$ | S2′ | numeral, (1,2,4,8,A,B) |
| letter plus 2nd additional code (No. 3b in Table 2) | $E_1$ | $N_2$ & $N_3$ | S2′ | letter, (1,2,4,8,A,B) |

The operation of data conversion in which byte unit data of No. 1*b* (example of data: numerals 9 and 6) are converted into character unit data of No. 1*c* (example of data: numeral 9) and also into character unit data of No. 2c (example of data: numeral 6) will be more specifically described in conjunction with FIGS. 4, 6B, 10 and 13.

Figure 10:
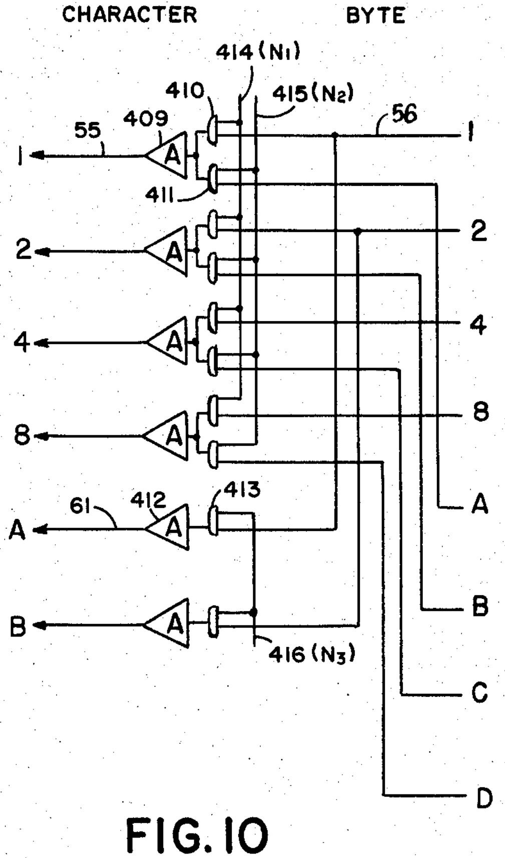

The multivibrator S1 receives a data conversion starting signal S0 from control circuit 29 through signal line 76 of the signal line group 19. Therefore, the multivibrator S1 generates the waveform S1′. The latter is applied to register 33 through a signal line 501 (FIG. 6B). As a result, byte unit data of No. 1*b* (example of data: numerals 9 and 6) in Table 3 supplied from register 25 is stored in the storage positions (1, 2, 4, 8, A, B, C, D) of register 33 through signal line group 15. Namely, data (1, 0, 0, 1, 0, 1, 1, 0) is stored in the storage positions (1, 2, 4, 8, A, B, C, D) of register 33, respectively. The output waveform S1′ from the multivibrator S1 is sent to the multivibrator S2 via signal line 501. Consequently, the multivibrator S2 generates the output waveform S2′. At this time, decision circuits 37 and 38 are both reset at the "0" state in their initial states. Therefore, the respective output waveforms $\overline{E}_1$ and $\overline{E}_2$ of decision circuits 37 and 38 are supplied to AND gates 522 and 503 through a signal line 515 of signal line group 47 and a signal line 521 of signal line group 48. For this reason, receipt of the output waveforms $\overline{E}_1$ and $\overline{E}_2$ and the output waveform S2′, AND gate 522 generates an output signal in a signal line 526. The output signal serves as one to produce an output signal $N_1$ in a signal line 414 of signal line group 68. The signal $N_1$ is used foR one for setting data in the storage positions (1, 2, 4, 8) of register 33 to the storage positions (1, 2, 4, 8, A, B) of register 31 through circuit 32. In FIG. 10, for instance, since an input signal is supPlied to an AND gate 410 through a signal line 56 of signal line group 41, AND gate 410 is opened and an output signal therefrom is produced in a signal line 55 through an amplifier 409. The output signal is applied to register 31 through signal lines group 40. Likewise, data (1, 0, 0, 1) in the storage positions (1, 2, 4, 8) of register 33 is set into the storage positions (1, 2, 4, 8, A, B) of register 31 in the form of character unit data (1, 0, 0, 1, 0, 0) through circuit 32. The multivibrator S5 receives the waveform S2′ through a signal line 502, AND gate 503, and a signal line 504, thereby generating the output waveform S5′. In response to the output signal, character unit data stored in register 31 are set into register 22 of central processor 11 through an OR gate circuit 534 and a signal line 65. Thus, character unit data (1, 0, 0, 1, 0, 0) in the storage positions (1, 2, 4, 8, A, B) of register 31 is set into register 22. Register 31 receives the data conversion ending signal from control circuit 27 through signal line 77, and register 31 is therefore reset. The multivibrator S6 receives the waveform S5′ through a signal line 505 to generate the output signal S6′. This waveform S6′ is applied to an AND gate 523 through a signal line 506. Under this state, the reset-side output signals $\overline{E}_1$ and $\overline{E}_2$ and the output signal S6′ are supplied to AND gate 523. For this reason, AND gate 523 produces an output signal $N_2$ in a signal line 415 of signal line group 68 through a signal line 527 and an OR gate circuit 531. The output signal $N_2$ serves as one for setting data stored in the storage positions (A, B, C, D) of register 33 into the storage positions (1, 2, 4, 8, A, B) of register 31 through circuit 32. For example, in FIG. 10, the output signal $N_2$ is applied to an AND gate circuit 411 through signal line 415. As a result, AND gate 411 is opened to produce an output sIgnal in signal line 55 through amplifier 409. Namely, data (0, 1, 1, 0, 0, 0) is set into the storage positions (1, 2, 4, 8, A, B) of register 31. The waveform S6′ is supplied to the multivibrator S3 through signal line 506, an OR gate circuit 508, and a signal line 509 to produce an output waveform S3′ in the multivibrator S3. The output waveform S3′ resets register 33 through a signal line 510 of signal line group 69. The waveform S4′ set by the trailing edge of the waveform S3′ serves as a signal for setting character unit data stored in register 31 into the register 22 through a signal line 511, OR gate 534 and signal line 65 of signal lines group 18. Thus, character unit data (0, 1, 1, 0, 0, 0) in the storage positions (1, 2, 4, 8, A, B) of register 31 is set into register 22. After this setting operation, register 31 is reset by the data conversion ending signal given from control circuit 27 through signal line 77.

FIG. 14 is a signal time-chart of the output waveforms appearing in each circuit of FIGS. 5, 6A and 6B when byte data of No. 2*b* and byte data of No. 3*b* in Table 3 are converted into character unit data of No. 3*c* and No. 4*c*, respectively. Upon receipt of the data conversion starting signal S0, the multivibrator S1 generates the waveform S1′. Therefore, byte unit data of No. 2*b* (example of data: numeral 3) in Table 3 supplied from register 25 are stored in the storage positions (1, 2, 4, 8, A, B, C, D) of register 33. More specifically, data (1, 1, 0, 0, 1, 1, 1) aS stored in the storage positions (1, 2, 4, 8, A, B, C, D) of register 33, respectively. When the storage positions (A, B, C, D) of register 33 are all "1," four "1" output signals are supplied to an AND gate 71 through signal line group 43. As a consequence, AND gate 71 produces an output signal and applies it to an AND gate circuit 512 through a signal line 70. In this state, when AND gate 512 receives the waveform S1′, it is opened to set decision circuit 37 through a signal line 513. Accordingly, the output waveform $E_1$ is produced in a signal line 532. Upon receipt of the output waveform S1′, the multivibrator S2 generates the output waveform S2′. Since decision circuit 37 is in the "1" state and the decision circuit 38 is reset to the initial state "0", their output waveforms $E_1$ and $\overline{E}_2$ are applied to an AND gate 524 through signal line 532 of signal line group 47 and signal line 521 of signal line group 48. As a result, AND gate 524 is opened and the output signal $N_1$ is produced in signal line 414 of signal line group 68 through a signal line 528 and an OR gate 530. By this output signal $N_1$, data (1, 1, 0, 0) in the storage positions (1, 2, 4, 8) of register 33 is set into the storage positions (1, 2, 4, 8) of register 31 in the form of data (1, 1, 0, 0) through data converting circuit 32. The storage positions (A, B) of register 31 remain reset, in other words, in the (0, 0) state, since the storage positions (A, B) represents numerical data. In this state, decision circuit 37 is in the "1" state and, therefore, the output waveform $E_1$ is sent to an AND gate circuit 507 through signal line 532, an OR gate circuit 516, and a signal line 517. Moreover, when the waveform S2′ is applied to AND gate 507 through signal line 502, AND gate 507 is opened, thereby generating an output signal. This output signal is sent to the multivibrator S3 through an OR gate circuit 508. The multivibrator S3 produces the output waveform S3′ which resets register 33 through signal line 510. The waveform S4′ set by the trailing edge of the waveform S3′ serves as the signal for setting character unit data (1, 1, 0, 0, 0, 0) in the storage positions (1, 2, 4, 8, A, B) of register 31 into register 22 through signal line 65. After this setting operation is completed, the data conversion ending signal from the control circuit 27 (FIG. 2) through signal line 77 is applied to register 31, which is thus reset. Upon further receipt of the data conversion starting signal S0, the multivibrator S1 generates the output waveform S1′. Therefore, data (1, 0, 1, 1, 1, 0, 0, 0) is respectively stored in the storage positions (1, 2, 4, 8, A, B, C, D) of register 33. Since the data storage positions (4,8) of register 33 are both "1", two "1" output signals are supplied to an AND gate 73 through signal line group 44. As a result, the output signal of AND gate 73 is supplied to an AND gate 518 through a signal line 72. Under this state, when the waveform S1 is applied to AND gate 518, that gate is opened whereby decision circuit 38 is set through a signal line 519 and the output waveform $E_2$ is produced in a signal line 520. Simultaneously, the multivibrator S2 receives the output waveform S1′ from the multivibrator S1, thereby generating the output waveform S2′. Also, the "1" (set) side output waveform $E_2$ of decision circuit 38 is sent to an AND gate circuit 525 through signal line 520 and, therefore, AND gate 525 is opened, and the output signal $N_2$ and an output signal $N_3$ are generated in signal lines 415 and 416, respectively, which are included in signal line group 68. The output signal $N_2$ serves as one for setting data (0, 0, 0, 0) in the storage positions (A, B, C, D) of register 33 into the storage positions (1, 2, 4, 8) of register 31 through circuit 32. Immediately thereafter, the output signal $N_3$ serves as one for setting data (1, 0) stored in the storage positions (1, 2) of register 33 into the storage positions (A, B) of register 31 through circuit 32. Since decision circuit 38 is in the "1" state, the output waveform S3′ is generated by the trailing edge of the waveform S2′. This output waveform S3′ resets register 33 via signal line 510. The waveform S4′ set by the trailing edge of the waveform S3′ is used as the signal for setting character data (1, 0, 0, 0, 1, 0) in the storage positions (1, 2, 4, 8, A, B) of register 31 into register 22. After this setting operation, register 31 is reset by the data conversion ending signal supplied from control circuit 27 through signal line 77.

As has been described above, the present invention provides an improved data converting method and data converter in which data is converted from character unit into byte unit and vice versa. It is apparent that the invention is applicable to a data converting method and data converter for use in a more expanded character unit and byte unit data systems. It is also apparent that the data converting method and data converter of this invention can be utilized not only for computer systems and electronic exchange systems but also for other electronic data processing systems. In the embodiment of the invention herein specifically described, numerical data are packed by every even number (two). Instead, the every data may be packed by every predetermined plurality of numbers. In this data conversion, additional code corresponding to the foregoing second additional code are added to the significant bits of excess numerical data. Also, in the specific embodiment shown, no parity bit or the like is added to letter data and numerical data. However, it is apparent that such parity bit or similar bit may be used for letter data and numerical data.

The invention is thus not limited to this specificAlly described embodiment, but various modifications and alternatives may be proposed within the scope of the present invention.

We claim:

1. A method for converting a first data of a first predetermined number of binary digits into a second data of a second predetermined number of binary digits and vice versa in response to first and second data-conversion signals supplied from a central data processor, respectively, said first data including letter data and numerical data, said method comprising the steps of adding a first additional code to said letter data before the conversion of the first data into the second data, packing and converting a predetermined number of bits of said numerical data into the second data after redundant bits not relative to the expression of its contents have been omitted therefrom, adding a second additional code to the excess numerical data produced in said packing step into the second data after the omission of the non-relative redundant bits of the excess numerical data, converting the portion of the second data having said first additional code into one letter data while converting the portion of the second data including said second additional code into one numerical data, and converting the portion of the second data which does not include said first and second additional codes into a predetermined plural number of the numerical data.

2. A data converting apparatus for converting a first data of a first predetermIned number of binary digits into a second data of a second predetermined number of binary digits and vice versa in response to first and second data-conversion signals supplied from a central data processor, respectively, said first data including letter data and numerical data, said apparatus comprising a first decision circuit for discriminating whether a portion of said first data is letter data or numerical data; a second decision circuit for discriminating whether a portion of said second data is one that is converted from said letter data or from said numerical data; an output timing signal generating circuit for generating first and second control signals upon receipt of the first and the second data-conversion signals, respectively, said first and second control signals being used for conversion of the first data into the second data and of the second data into the letter data or the numerical data in response to the outputs of said first and second decision circuits, respectively; a first data converting circuit responsive to said first control signal for adding a first additional code to said letter data for converting said first data into said second data, for packing a predetermined number of serial bits of said numerical data into the second data after omitting redundant bits not relative to the expression of the contents thereof and for adding a second additional code thereto; and a second data converting circuit responsive to said second control signal for converting portions of the second data having said first additional code into said letter data, for converting portions of the second data having said second additional code into numerical data, and for converting portions of the second data having neither the first nor second additional codes into a predetermined plural number of numerical data.

3. The apparatus of claim 2, further comprising first storing means having said first predetermined number of stages and coupled to said first decision circuit and said timing signal generating circuit, second storing means having said second predetermined number of stages and coupled to said second decision circuit and said timing signal generating circuit, and data converting means including said first and second data converting circuits coupled between said first and second storing means and said timing signal generating circuit.

4. The apparatus of claim 3, in which said first data converting circuit comprises said second predetermined number of amplifiers, each of said amplifiers having an output coupled respectively to the stages of said second storing means and an input, and logic means respectively coupled intermediate inputs of said amplifiers and the stages of said first storage means and said first decision circuit.

5. The apparatus of claim 3, in which said second data converting circuit comprises said first predetermined number of amplifiers, each of said amplifiers having an output coupled respectively to the stages oF said first storing means and an input, and second loGic means respectively coupled intermediate inputs of said amplifiers and the stages of said second storing means and said second decision circuit.

* * * * *